US009414179B2

(12) United States Patent
Ueda et al.

(10) Patent No.: US 9,414,179 B2
(45) Date of Patent: Aug. 9, 2016

(54) OPERATIONAL CONTROL OF AN APPARATUS THROUGH A TERMINAL DEVICE (71) Applicant: Sony Corporation, Tokyo (JP)

(72) Inventors: Roka Ueda, Tokyo (JP); Takashi Onohara, Tokyo (JP); Seizi Iwayagano, Chiba (JP); Yuji Kawabe, Tokyo (JP); Keishi Daini, Kanagawa (JP); Takuma Higo, Tokyo (JP); Taichi Yoshio, Kanagawa (JP); Eri Sakai, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/770,001

(22) Filed: Feb. 19, 2013

(65) Prior Publication Data
US 2013/0244637 A1 Sep. 19, 2013

(30) Foreign Application Priority Data

Mar. 15, 2012 (JP) ................................ 2012-058228

(51) Int. Cl.
*H04M 1/00* (2006.01)
*H04W 4/00* (2009.01)

(52) U.S. Cl.
CPC .................... *H04W 4/001* (2013.01)

(58) Field of Classification Search
None
See application file for complete search history.

(56) References Cited

U.S. PATENT DOCUMENTS

2009/0061841 A1* 3/2009 Chaudhri et al. ............. 455/420
2009/0259719 A1* 10/2009 Kindberg et al. ............. 709/204
2010/0014007 A1* 1/2010 Kotani .................... G03B 21/00 348/744
2010/0097239 A1* 4/2010 Campbell et al. ........ 340/825.25
2010/0311400 A1* 12/2010 Davis .......................... 455/414.3
2012/0046050 A1* 2/2012 Hymel et al. ............... 455/456.3
2013/0176415 A1* 7/2013 Kim .................... H04N 5/23219 348/78

FOREIGN PATENT DOCUMENTS

| JP | 2005-269520 | 9/2005 |
| JP | 2008-278388 | 11/2008 |
| JP | 2009-300537 | 12/2009 |
| JP | 2010-212775 | 9/2010 |
| JP | 2011-176591 | 9/2011 |
| JP | 2013-135378 | 7/2013 |

OTHER PUBLICATIONS

Japanese Office Action issued on Dec. 22, 2015 for Japanese Patent Application 2012-058228.
Japanese Office Action issued Apr. 12, 2016, in Japanese Patent Application 2012-058228.

* cited by examiner

*Primary Examiner* — Suhail Khan
(74) *Attorney, Agent, or Firm* — Oblon, McClelland, Maier & Neustadt, L.L.P.

(57) ABSTRACT

The present disclosure provides an information processing apparatus, an information processing method, an information processing program, and a terminal apparatus for offering information in more quantity and in further detail than before by having a plurality of devices linked with one another. The information processing apparatus includes a first device and a second device interconnected with each other. Application information about an application executing on the first device is acquired through a communication block included in the second device. Display on a display block included in the second device is controlled based on the application information.

8 Claims, 6 Drawing Sheets

OPERATIONAL CONTROL OF AN APPARATUS THROUGH A TERMINAL DEVICE

BACKGROUND

The present disclosure relates to an information processing apparatus, an information processing method, an information processing program, and a terminal apparatus.

Recent years have witnessed the widespread use of portable terminal apparatuses such as mobile phones and smartphones equipped with diverse applications that offer varieties of services and functions. In order to increase the usefulness of such applications, it has been desired to have the portable terminal apparatuses linked with other devices. There have been proposed an in-vehicle apparatus and a communication control method for enabling these terminal apparatuses to let the services and functions made available by execution of their applications be utilized on the side of the in-vehicle apparatus through linkage therebetween (see Japanese Patent Laid-Open No. 2010-199718).

SUMMARY

However, even if such linkage helps boost the usefulness of the applications made available from the portable terminal apparatus, the display and input devices of the in-vehicle apparatus are usually limited in size and are often insufficient for displaying content-related information or difficult to operate given the size constraints.

The present disclosure has been made in view of the above circumstances and provides an information processing apparatus, an information processing method, an information processing program, and a terminal apparatus for offering information in more quantity and in further detail than before by having a plurality of devices linked with one another.

According to one embodiment of the present disclosure, there is provided an information processing apparatus including a first device and a second device interconnected with each other. Application information about an application executing on the first device is acquired through a communication block included in the second device. Display on a display block included in the second device is controlled based on the application information.

According to another embodiment of the present disclosure, there is provided an information processing method for use with a first device and a second device interconnected with each other. The information processing method includes: acquiring application information about an application executing on the first device through a communication block included in the second device; and controlling display on a display block included in the second device based on the application information.

According to a further embodiment of the present disclosure, there is provided an information processing program for executing an information processing method in conjunction with a first device and a second device interconnected with each other. The information processing method includes: acquiring application information about an application executing on the first device through a communication block included in the second device; and controlling display on a display block included in the second device based on the application information.

According to an even further embodiment of the present disclosure, there is provided a terminal apparatus including a display block and a communication block. Application information about an application executing on another device connected to the terminal apparatus is acquired through the communication block. Display on the display block is controlled based on the application information.

According to the present disclosure embodied as outlined above, information may be displayed in more quantity and in further detail than ever by having a plurality of devices linked with one another.

DETAILED DESCRIPTION OF THE PREFERRED EMBODIMENTS

Some preferred embodiments of the technology of the present disclosure are described below in reference to the accompanying drawings. It should be understood that this technology is not limited to the embodiments to be described hereunder. The description will be made under the following headings:

<1. Embodiments>
[1-1. Structure of the terminal apparatus]
[1-2. Structure of the content reproduction apparatus]
[1-3. Information processing]
<2. Variations>

1. Embodiments

[1-1. Structure of the Terminal Apparatus]

Figure 1:
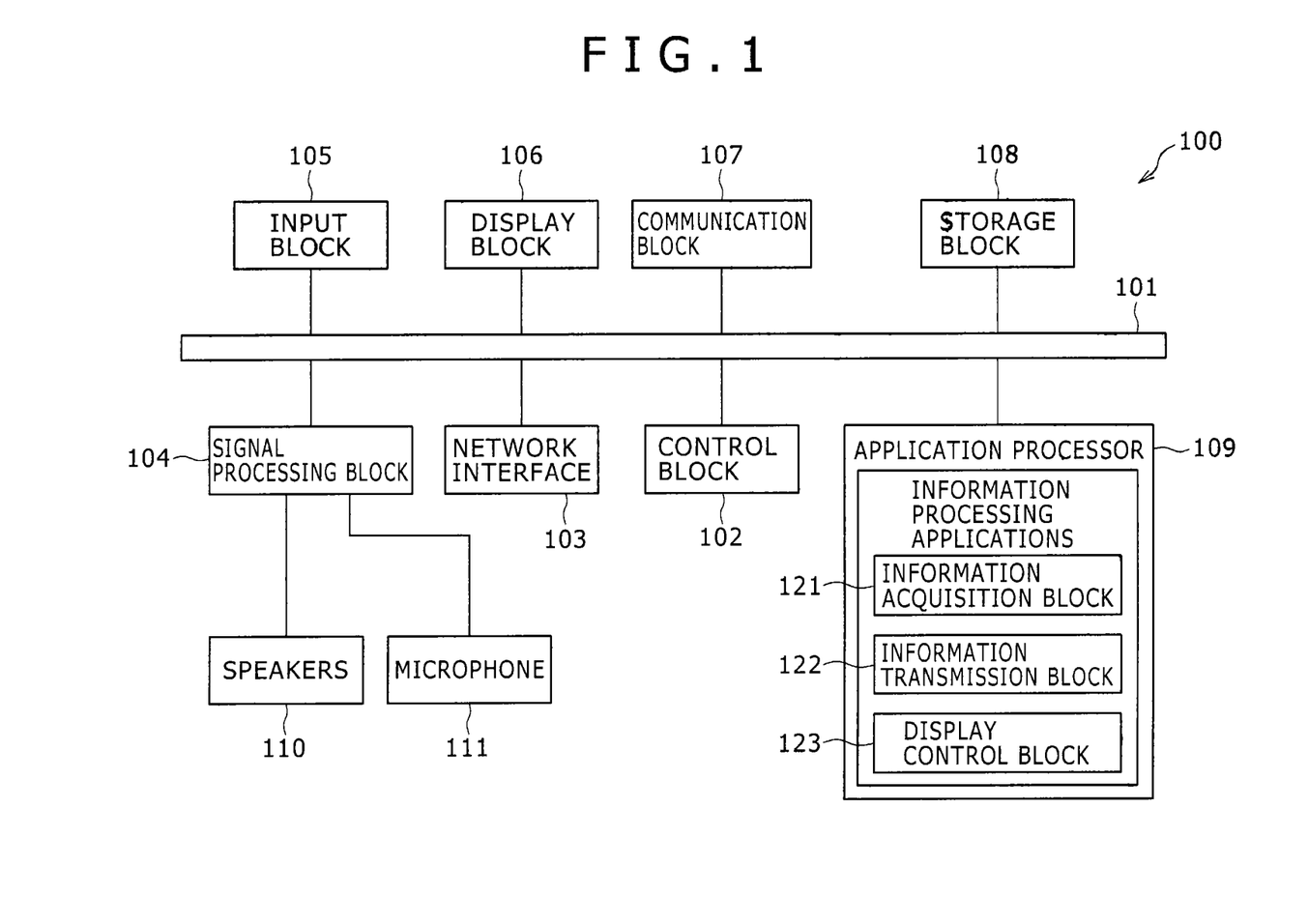
FIG. 1 is a block diagram showing a structure of a terminal apparatus as an example of the second device of an embodiment of the present disclosure.

FIG. 1 is a block diagram showing a structure of a terminal apparatus 100 according to the embodiment of the present disclosure. The terminal apparatus 100 is an example of the second device described in the appended claims. The terminal apparatus 100 includes a data bus 101 connected with a control block 102, a network interface 103, a signal processing block 104, an input block 105, a display block 106, a communication block 107, a storage block 108, and an application processor 109.

The control block 102 is composed of a CPU (central processing unit), a RAM (random access memory), and a ROM (read only memory), for example. The ROM stores, among others, the programs to be retrieved and executed by the CPU. The RAM serves as a work memory for use by the CPU. The CPU controls the components making up the terminal apparatus 100 and exercises overall control over the apparatus by performing diverse processes in accordance with the programs stored in the ROM.

The network interface 103 exchanges data with external base stations and other entities based on a predetermined protocol, for example. The communication method to be used may be a wireless LAN (local area network), Wi-Fi (Wireless Fidelity), 3G-based communication, or any other suitable method. The communication via the network interface 103 allows the terminal apparatus 100 to connect to the Internet or place a call to another party.

The signal processing block 104 includes a MODEM (modulator-demodulator), an AD/DA (analog to digital) converter, and an audio codec (not shown). The MODEM of the signal processing block 104 modulates an outgoing audio signal and demodulates the received signal. The outgoing signal is converted to a digital signal and the received signal is converted to an analog signal by the AD/DA converter. The signal processing block 104 is further connected with speakers 110 that provide audio output and with a microphone 111 to which sounds are input.

The input block 105 is an input unit through which a user makes diverse kinds of input to the terminal apparatus 100. For example, the input block 105 is made up of buttons, a touch panel, and switches. Alternatively, the input block 105 may be structured as a touch screen attached integrally to the display block 106. When the user performs an input operation on the input block 105, a control signal corresponding to the input is generated and output to the control block 102. In turn, the control block 102 performs arithmetic processing or control operations corresponding to the control signal.

The display block 106 is a display unit composed of an LCD (liquid crystal display), a PDP (plasma display panel), or an organic EL (electroluminescence) panel, for example. The display block 106 displays a home screen showing the menu of various operations of the terminal apparatus 100, song lists, information about the currently reproduced audio content (artist's name, song title, etc.), video content, and picture content, among others.

The communication block 107 is a communication module that communicates with the terminal apparatus 100 through Bluetooth, USB connection or the like. The communication method to be used by the communication block 107 may typically be Bluetooth (wireless communication) or USB (wired communication). A Bluetooth module for Bluetooth communication is a module that permits data exchanges through near field communication according to the Bluetooth standard. The Bluetooth module exchanges data with the content reproduction apparatus, which is an external Bluetooth apparatus.

The Bluetooth module includes an antenna and a signal processing block (not shown). For example, when transmitting audio data to the content reproduction apparatus 200 (an external Bluetooth apparatus), the Bluetooth module gets the signal processing block to perform predetermined signal processing on the outgoing audio data and transmits the processed audio data to the content reproduction apparatus 200 via the internal antenna. In the case where the Bluetooth module transmits audio data to the content reproduction apparatus 200, when receiving audio data from the content reproduction apparatus 200, the Bluetooth module gets the internal antenna to receive the incoming audio data and feeds the received data to the internal signal processing block 104. In turn, the signal processing block 104 performs predetermined signal processing on the audio data to generate an audio signal. In this manner, the audio data reproduced by the terminal apparatus 100 may be output from the content reproduction apparatus 200, and the audio data reproduced by the content reproduction apparatus 200 may be output from the terminal apparatus 100.

Where USB (for wired communication) is adopted as the communication method for the communication block 107, a USB cable is used to connect the content reproduction apparatus 200 with the terminal apparatus 100.

It should be noted that any appropriate method may be adopted for connection between the apparatuses. Besides Bluetooth or USB, any suitable method that permits desired data communication may be adopted. The communication method may be selected in accordance with the type of the terminal apparatus 100 and the type of the OS (operating system) in use.

The storage block 108 is composed of a mass storage medium such as a hard disk drive (HDD) or a flash memory. As such, the storage block 108 stores diverse applications and content data.

The application processor 109 is a processor that executes various applications installed in the terminal apparatus 100. The technology of this disclosure is implemented when the application processor 109 executes information processing applications installed in the terminal apparatus 100. By executing the information processing applications, the application processor 109 functions as an information acquisition block 121, an information transmission block 122, and a display control block 123. The functions implemented by execution of the information processing applications correspond to the information processing apparatus described in the appended claims.

The information acquisition block 121 acquires information (application information) indicating that an application for reproducing content from content sources is executing on the content reproduction apparatus 200, the information being obtained from the content reproduction apparatus 200 via the communication block 107. The application information further indicates the type of the currently executing application. The content sources include Internet radio stations, an external storage connected through USB or the like, and a disk medium module for reproducing data from disk media. Internet radio is reproduced by an Internet radio output application; the content from the external storage is reproduced by an external storage content reproduction application; and data from the disk medium is reproduced by a disk reproduction application.

Also, the information acquisition block 121 acquires information (content information) about the content to be reproduced by an application on the content reproduction apparatus 200, the information being obtained from the content reproduction apparatus 200 via the communication block 107. If the content is music data, the content information may include the title of the currently reproduced song, the artist's name, the album title, a jacket picture, the genre name, and tempo information. In addition, the content information may include the title of songs of a plurality of content stored in content sources in the content reproduction apparatus 200, the artist's name, the album title, a jacket picture, the genre name, and tempo information. It should be noted that the content information is not limited to these items; other items may be included in the information as long as they pertain to the content in question.

Incidentally, the information acquisition block 121 may acquire content information from the CDDB (Compact Disc Data Base) or the like over the Internet.

Furthermore, through the communication block 107, the information acquisition block 121 acquires display update information indicating an update of display details on a display block 211 of the content reproduction apparatus 200. The display update information will be discussed later in detail.

Where Bluetooth is used for communication by the technology of this disclosure, application information, content information, display update information are exchanged using the Serial Port Profile between the terminal apparatus 100 and the content reproduction apparatus 200. Where USB is used for the connection between the content reproduction apparatus 200 and the terminal apparatus 100, iAP is used to permit exchanges of application information, content information, and display update information therebetween.

Since the Serial Port Profile and iAP enable exchanges of any information, utilization of such protocols permits exchanges of the above-mentioned kinds of information for use by the technology of this disclosure. However, some other method may be adopted instead if it allows the above-mentioned information to be exchanged. Also, besides Bluetooth or USB, some suitable method may be adopted as long as it permits communication of desired data.

When the user performs an input operation on the input block 105, the information transmission block 122 transmits operation information reflecting the details of the input operation to the content reproduction apparatus 200 via the communication block 107. As will be discussed later in detail, performing input operations on the input block 105 of the terminal apparatus 100 allows the terminal apparatus 100 to operate the content reproduction apparatus 200.

Based on the application information, the display control block 123 performs display control to make the display on the display block 106 transition to an information display screen displaying information about the content currently reproduced on the content reproduction apparatus 200. The display control block 123 also performs processing to update display details on the information display screen based on the display update information.

The information processing applications may be offered to the user in a manner preinstalled in the terminal apparatus 100 or in such a manner as to be installed by the user into the terminal apparatus 100. The information processing applications are offered or marketed from online application selling sites or application download services on the Internet, for example. Alternatively, the information processing applications may be offered or marketed using portable recording media such as an optical disk or a semiconductor memory on which the applications are recorded.

The speakers 110 constitute an audio output unit for audio output. Given the audio signal having undergone predetermined processing by the signal processing block 104 for example, the speakers 110 output sounds corresponding to the processed signal. In this manner, the user can listen to the voice of a call or to the audio data or the like held in the terminal apparatus 100. The microphone 111 is used to input the voice of a call, audio instructions or the like to the terminal apparatus 100. The sound input from the microphone 111 is subjected to predetermined processing by the signal processing block 104.

The terminal apparatus 100 is structured as described above. For example, the terminal apparatus 100 may be a mobile phone, a smartphone, a portable music player, or a tablet terminal. Although not shown, the terminal apparatus 100 may incorporate a camera function formed by an imaging block and an image processing block, as well as a radio function.

Figure 2:
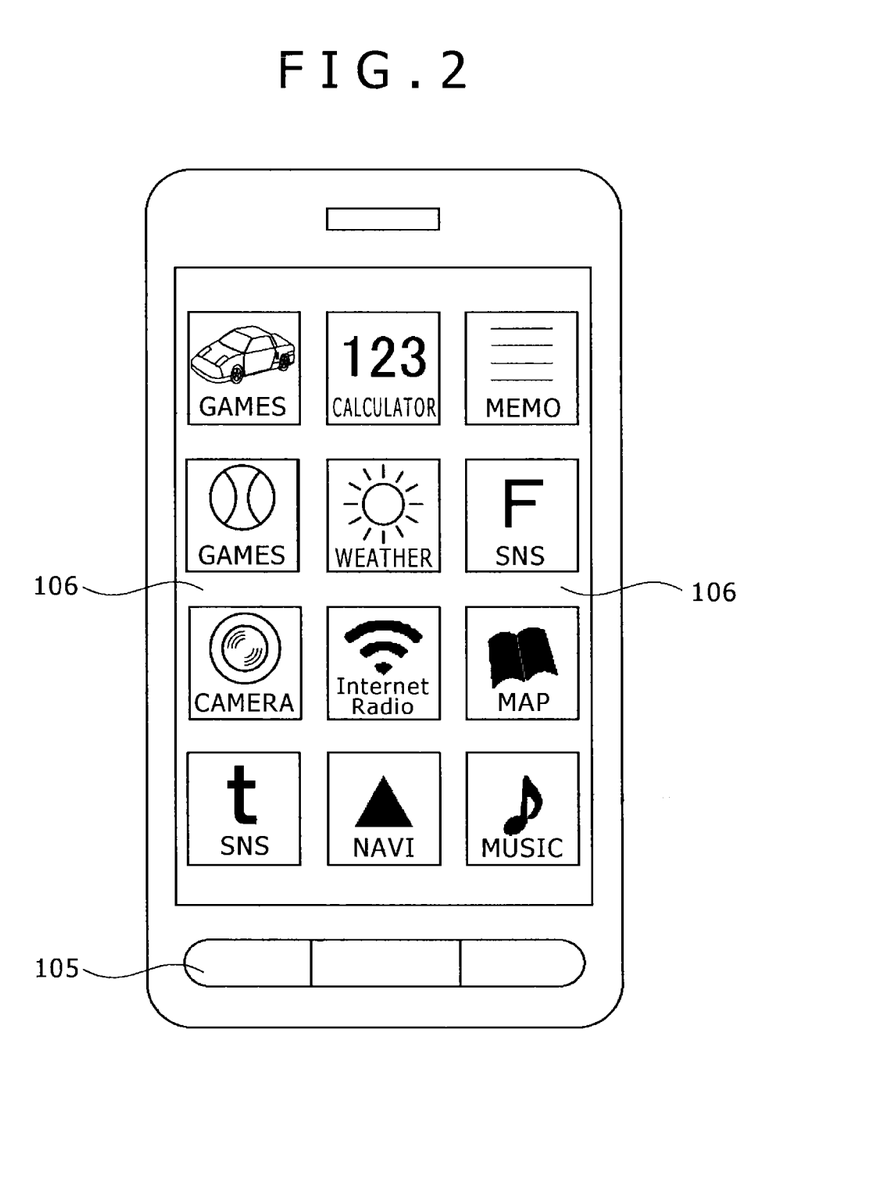
FIG. 2 is a schematic view showing a typical external structure of the terminal apparatus.

FIG. 2 is a schematic view showing a typical external structure of the terminal apparatus 100. FIG. 2 indicates the display block 106, a touch screen as part of the input block 105, and buttons also constituting the input block 105 of the terminal apparatus 100. In FIG. 2, a plurality of icons indicative of installed applications are shown displayed on the display block 106.

As shown in FIG. 2, the terminal apparatus 100 such as the mobile phone, smartphone, portable music player, or tablet terminal should preferably be equipped with a large-sized, high-resolution display block. On such a display block, information can be presented to the user in more quantity at higher resolution than before when displayed.

If the input block 105 and display block 106 integrally make up a touch screen, the user can select, reproduce or stop content intuitively by directly touching the displayed icons and character strings on the touch screen with fingertips.

It should be noted that the external structure of the terminal apparatus 100 shown in FIG. 2, the manner in which display is made on the display block 106, and the button layout on the input block 105 are only examples and are not limited to what is shown in FIG. 2.

[1-2. Structure of the Content Reproduction Apparatus]

Figure 3:
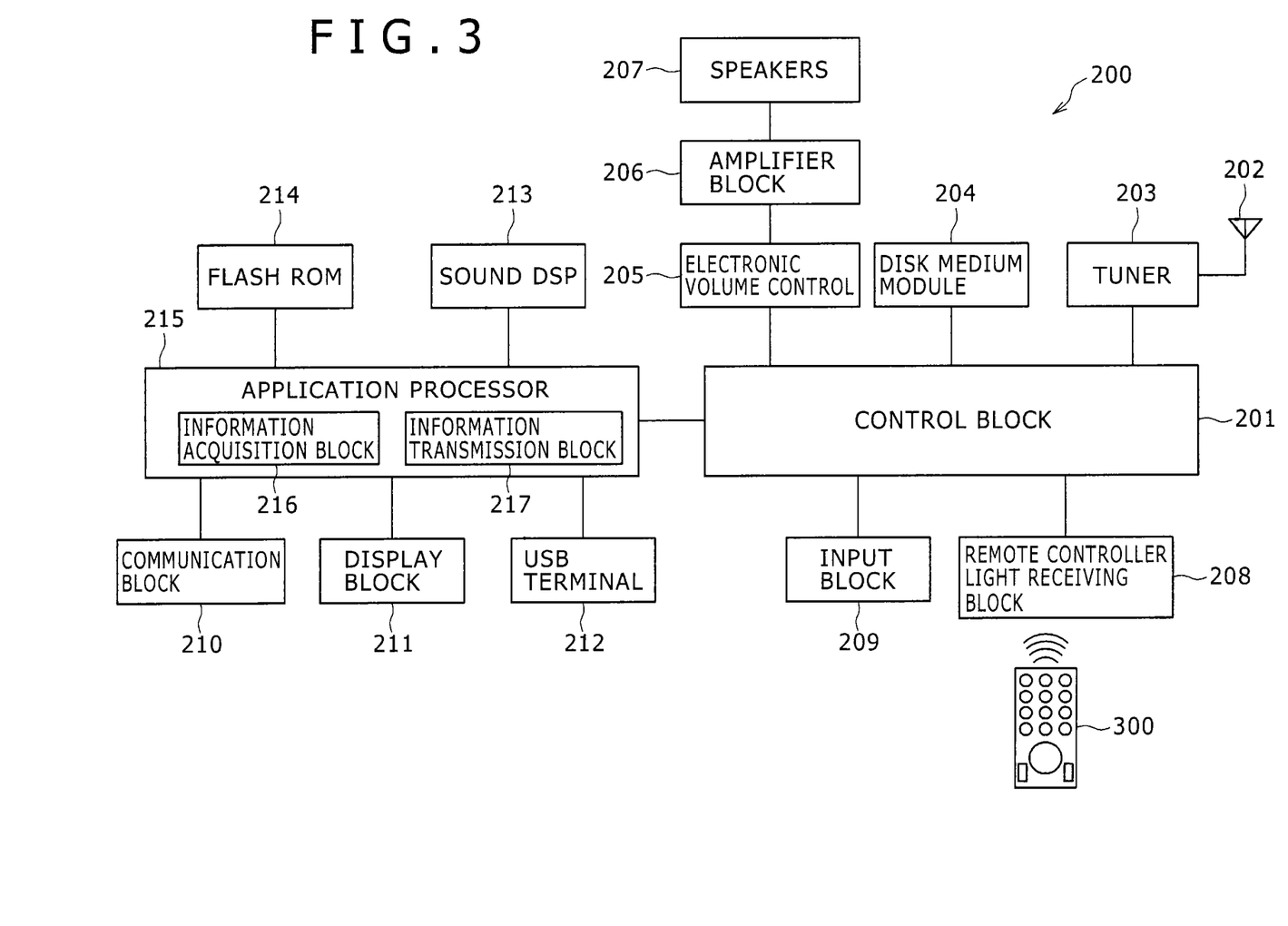
FIG. 3 is a block diagram showing a structure of a content reproduction apparatus as an example of the first device of the embodiment of the present disclosure.

FIG. 3 is a block diagram showing a structure of the content reproduction apparatus 200 according to the embodiment of the present disclosure. The content reproduction apparatus 200 is an example of the first device described in the appended claims. The content reproduction apparatus 200 is a so-called stand-alone apparatus such as car audio equipment for reproducing content on board a vehicle, or a dock speaker primarily for use in the household. The content to be reproduced by the content reproduction apparatus 200 may be audio content such as music and video content, for example.

The content reproduction apparatus 200 is made up of a control block 201, a radio antenna 202, a tuner 203, a disk medium module 204, an electronic volume control 205, an amplifier block 206, speakers 207, a remote controller light receiving block 208, an input block 209, a communication block 210, the display block 211, a USB terminal 212, a sound DSP (digital signal processor) 213, a flash ROM 214, and an application processor 215.

The control block 201 is composed of a CPU, a RAM, and a ROM, for example. The ROM stores, among others, the programs to be retrieved and executed by the CPU. The RAM serves as a work memory for use by the CPU. The CPU controls the components making up the content reproduction apparatus 200 and exercises overall control over the apparatus by performing diverse processes in accordance with the programs stored in the ROM. Also, the control block 201 controls the components constituting the content reproduction apparatus 200 and performs overall control over the apparatus on the basis of operation information transmitted from the terminal apparatus 100. For example, if the operation information designates reproduction of content, the control block 201 performs accordingly a content reproduction process on the content reproduction apparatus 200.

The radio antenna 202 is an antenna for receiving radio broadcast waves and is connected to the tuner 203. The tuner 203 restores radio audio data by performing such processes as demodulation of radio broadcast signals received by the radio antenna 202, analog/digital conversion, and decoding of encoded data. Under control of the control block 201, the radio audio data is forwarded to the speakers 207 via the electronic volume control 205 and amplifier block 206 and output as sounds by the speakers 207.

The disk medium module 204 is a disk reproduction device that retrieves an audio signal from a disk-type recording medium and performs predetermined signal processing on the retrieved audio signal to acquire the appropriate audio signal. Under control of the control block 201, the acquired audio signal is sent to the speakers 207 via the electronic volume control 205 and amplifier block 206 and output as sounds by the speakers 207. The disk-type recording medium may be a CD (Compact Disc), a DVD (Digital Versatile Disc), or a BD (Blu-ray Disc), for example.

The electronic volume control 205 under control of the control block 201 adjusts sound volume by amplifying the audio signal fed from the radio tuner 203, disk medium module 204, communication block 210, or USB terminal 212. Following sound volume control, the audio signal is supplied to the amplifier block 206. The amplifier block 206 amplifies to a predetermined level the audio signal supplied from the electronic volume control 205 and sends the amplified signal to the speakers 207. The speakers 207 constitute an audio output unit for outputting the audio signal fed from the amplifier block 206 as sounds to the outside.

The remote controller light receiving block 208 receives a control signal sent from a remote controller 300 attached to the content reproduction apparatus 200 following the user's operation on the controller, and outputs the received control signal to the control block 201.

The input block 209 is an input unit through which the user performs various input operations with regard to the content reproduction apparatus 200. The input block 209 is composed of buttons, a touch panel, and switches, for example. Alternatively, the input block 209 may be structured as a touch screen integrally attached to the display block 211. When the user makes input to the input block 209, the input block 209 generates a control signal corresponding to the input and outputs the generated control signal to the control block 201. Given the control signal, the control block 201 performs arithmetic or control operations accordingly.

With this embodiment, the user can perform on the input block 209 such operations as the selection of an application, determination to start the selected application, reproduction of content; and stop, fast forward, and rewind of the reproduced content.

The display block 211 is a display unit composed of an LCD, a PDP, or an organic EL panel, for example. The display block 211 displays a home screen displaying a menu of various operations that may be performed on the content reproduction apparatus 200, song lists, and information about the currently reproduced song (artist's name, song title, etc.), among others.

The communication block 210 is designed to communicate with the terminal apparatus 100. The communication block 210 has the same structure as its counterpart in the terminal apparatus 100. The audio data received from the terminal apparatus 100 by the communication block 210 is supplied to the sound DSP 213.

Where Bluetooth is adopted as the communication method, the Serial Port Profile is used to exchange application information, shared information, and operation information between the content reproduction apparatus 200 and the terminal apparatus 100. If USB is used for the connection between the content reproduction apparatus 200 and the terminal apparatus 100, the use of iAP allows desired information such as application information, shared information, or operation information to be exchanged therebetween.

It should be noted that any appropriate method may be adopted for connection between the apparatuses. Besides Bluetooth or USB, any suitable method that permits desired data communication may be adopted.

The USB terminal 212 is a USB-compatible connection terminal allowing an external device or an external recording medium to connect to the content reproduction apparatus 200. For example, the USB terminal 212 is connected with an external storage such as an external HDD (hard disk drive) or a USB memory retaining content data. If the content data held in the external storage is music data, for example, the data is sent under control of the control block 201 to the speakers 207 via the electronic volume control 205 and amplifier block 206, and the speakers 207 output the data as sounds.

If content is audio data, the data is stored on a storage medium or the like in a manner compressed by such methods as WAV (RIFF waveform Audio Format), MP3 (MPEG Audio Layer-3), or AAC (Advanced Audio Coding). The storage medium also stores music information including the names of the artists associated with the stored songs, album titles, song titles, total reproduction time, and reproduction time information, the music information being stored as meta data of the stored music data. If content is video data, the data is stored in such a data format as MPEG (Moving Picture Experts Group) or AVI (Audio Video Interleave).

The sound DSP 213 performs predetermined audio signal processing on the audio data fed from a Bluetooth module or the like acting as the communication block 210, and supplies the resulting audio signal to the electronic volume control 205. The audio signal is forward to the speakers 207 via the electronic volume control 205 and amplifier block 206, and the speakers 207 eventually output the audio signal as sounds.

The flash ROM 214 is a nonvolatile memory and stores diverse kinds of data such as device information about Bluetooth devices and radio broadcast frequency information. The device information and frequency information thus stored are retrieved as requested by the control block 201 and supplied thereto.

The application processor 215 performs predetermined processing on the side of the content reproduction apparatus 200 in linkage with the operation of an information processing application on the terminal apparatus 100. By executing appropriate applications, the application processor 215 functions as an information acquisition block 216 or an information transmission block 217.

The information acquisition block 216 acquires via the communication block 210 the operation information transmitted from the terminal apparatus 100. The acquired operation information is fed to the control block 201, and the control block 201 performs arithmetic or control operations corresponding to the supplied operation information. In this manner, the terminal apparatus 100 functions as a controller of the content reproduction apparatus 200. The content reproduction apparatus 200 can thus be controlled from the externally located terminal apparatus 100.

The information transmission block 217 transmits the application information indicating the type of the application executed to reproduce content and the display update information indicating update status of the display of content-related information, the information being sent to the terminal apparatus 100 through the communication block 210.

In this embodiment, the content reproduction apparatus 200 has three content sources: a tuner, a USB-connected external storage that holds content data, and a disk medium module. However, the number and types of content sources are not limited to these sources. Alternatively, the content reproduction apparatus 200 may be furnished with one content source or with many other content sources.

Figure 4A:
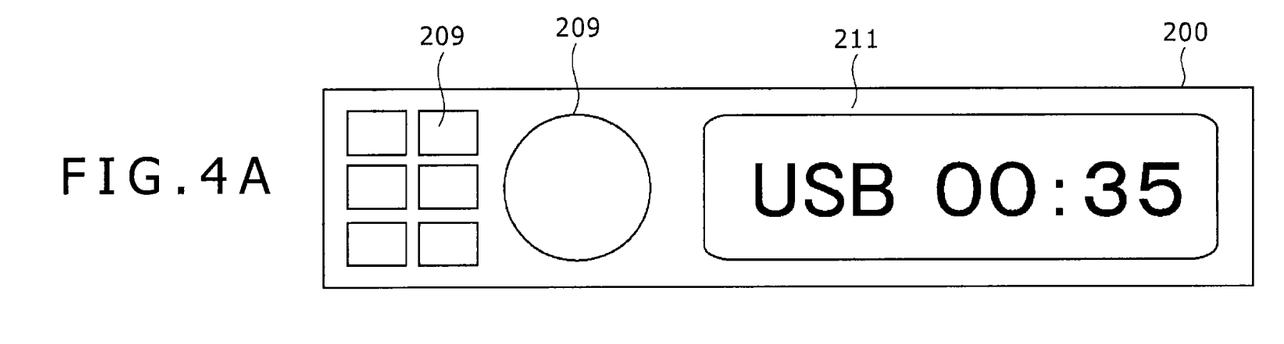
FIGS. 4A and 4B are schematic views showing typical external structures of the content reproduction apparatus.
Figure 4B:
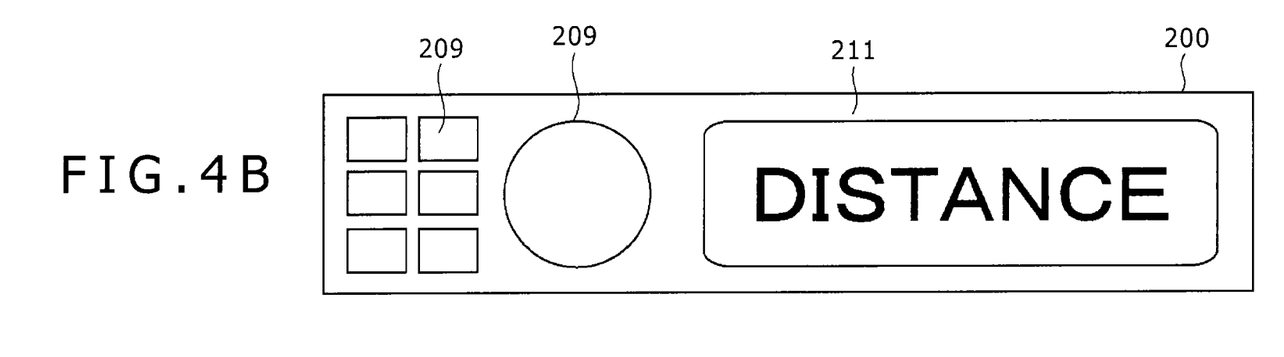

FIGS. 4A and 4B show typical external structures of car audio equipment as an example of the content reproduction apparatus 200. The drawings indicate an enclosure of the content reproduction apparatus 200, and the input block 209 and display block 211 housed in the front panel.

FIG. 4A shows the display block 211 of the content reproduction apparatus 200 displaying characters "USB" indicating the source of the content currently reproduced by the content reproduction apparatus 200. The display "USB" indicates ongoing reproduction of the content held in a USB memory or HDD connected externally to the content reproduction apparatus 200 via the USB terminal 212.

Also, FIG. 4A shows the display block 211 of the content reproduction apparatus 200 displaying the reproduction time of the currently reproduced music content by the side of the content source display.

Furthermore, FIG. 4B shows the title of the music content currently reproduced by the content reproduction apparatus 200. The display mode shown in FIG. 4A and that shown in FIG. 4B are switched when, for example, a display switching instruction is input through the input block 209.

Where the content reproduction apparatus 200 is car audio equipment or a dock speaker as mentioned above, the display part is often limited in size and can only display a limited amount of information. It follows that when different kinds of information are desired to be displayed, the screen typically needs to be scrolled or otherwise operated by inputting suitable operations through the input block 209.

It should be noted that the external structures of the content reproduction apparatus 200 and the display modes of the display block 211 shown in FIGS. 4A and 4B are only examples and are not limited to what is indicated in the drawings. For example, the content source and song title may be displayed side by side. Alternatively, the content source, reproduction time, and song title may be displayed separately. As another alternative, information other than these items may also be displayed.

[1-3. Information Sharing Processing]

Figure 5:
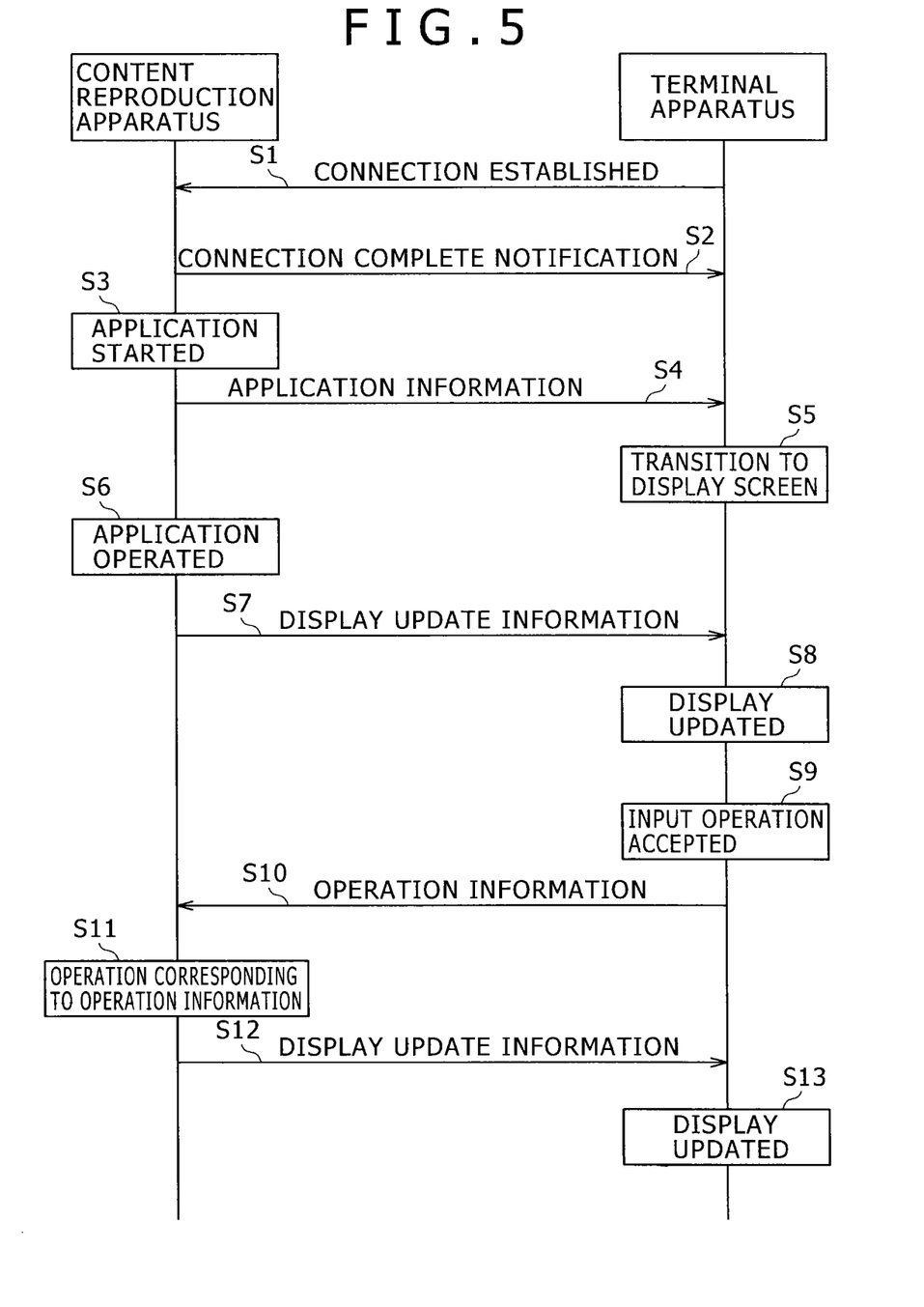
FIG. 5 is a sequence diagram showing the flow of processing performed between the terminal apparatus and the content reproduction apparatus.

Explained next is the information processing performed between the terminal apparatus 100 and content reproduction apparatus 200 discussed above. FIG. 5 is a sequence diagram showing the flow of processing performed between the terminal apparatus 100 and the content reproduction apparatus 200.

With this technology, the display block 106 of the terminal apparatus 100 acting as the second device displays information about the content currently reproduced on the content reproduction apparatus 200 operating as the first device. When an operation related to content reproduction such as the start, stop, fast forward, or rewind of the content is input to the terminal apparatus 100, the operation information is transmitted to the content reproduction apparatus 200. In turn, the content reproduction apparatus 200 performs the operation corresponding to the operation input. Operated in this manner, the terminal apparatus 100 serves as a combined display/input device coupled to the content reproduction apparatus 200.

In step S1 of FIG. 5, a connection is established between the content reproduction apparatus 200 and the terminal apparatus 100. The connection may be established between the communication blocks of both apparatuses through Bluetooth, USB or the like as described above. If the connection is made through Bluetooth, the Serial Port Profile is used to exchange information between the content reproduction apparatus 200 and the terminal apparatus 100. If the connection is made through USB, iAP is used to exchange information between the content reproduction apparatus 200 and the terminal apparatus 100.

Once the connection is established between the content reproduction apparatus 200 and the terminal apparatus 100, step S2 is reached. In step S2, the content reproduction apparatus 200 transmits a connection complete notification to the terminal apparatus 100. Alternatively, the terminal apparatus 100 may send the connection complete notification to the content reproduction apparatus 200 in the direction opposite to that which is shown in FIG. 5.

In step S3, the application for content reproduction is started on the content reproduction apparatus 200. The application is started typically by the user inputting a start instruction through the input block 209 of the content reproduction apparatus 200.

After the application is started on the content reproduction apparatus 200, the content reproduction apparatus 200 in step S4 transmits to the terminal apparatus 100 information indicating the type of the started application. If the reproduction of content is started at the same time that the application is started, the content information may also be transmitted simultaneously. In another example, when the application is started, the content information about all the content possessed by the content source in question may be transmitted to the terminal apparatus 100.

In step S5, the display control block 123 of the terminal apparatus 100 performs display processing based on the application information and causes the display on the display block 106 to transition to the information display screen.

In step S6, the application operating on the content reproduction apparatus 200 selects and reproduces the content. The operation of the application updates the display on the display block 211 of the content reproduction apparatus 200. Specifically, when content is reproduced, the title, reproduction time, etc., of the currently reproduced content are displayed. When a content selection operation is performed, candidate titles of content and other information may be displayed.

In step S7, the information acquisition block 121 of the terminal apparatus 100 acquires via the communication block 107 the above-mentioned display update information indicative of update details of the display on the content reproduction apparatus 200. The update information includes the content title, artist's name, album title, etc., to be displayed after the display update.

In step S8, based on the display update information, the display control block 123 of the terminal apparatus 100 updates the information display screen displayed on the display block 106. At display update time, the content title, artist's name, and album title are updated if the content to be reproduced is changed, for example. Where the content reproduction time is displayed, update information is transmitted continuously as the reproduction time advances. The reproduction time is thus updated continuously through display update.

Figure 6A:
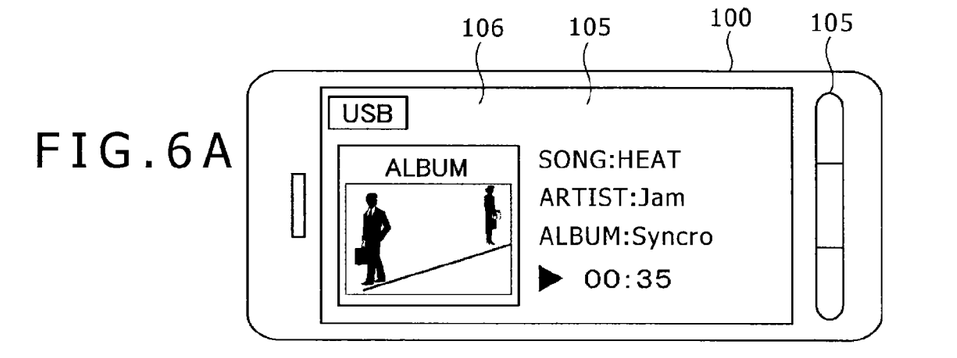
FIGS. 6A, 6B and 6C are schematic views showing typical information display screens of the terminal apparatus.
Figure 6B:
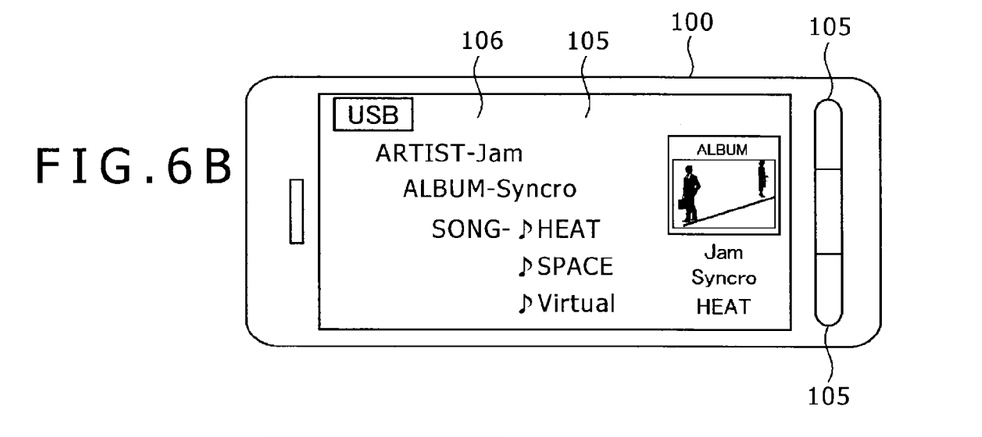
Figure 6C:
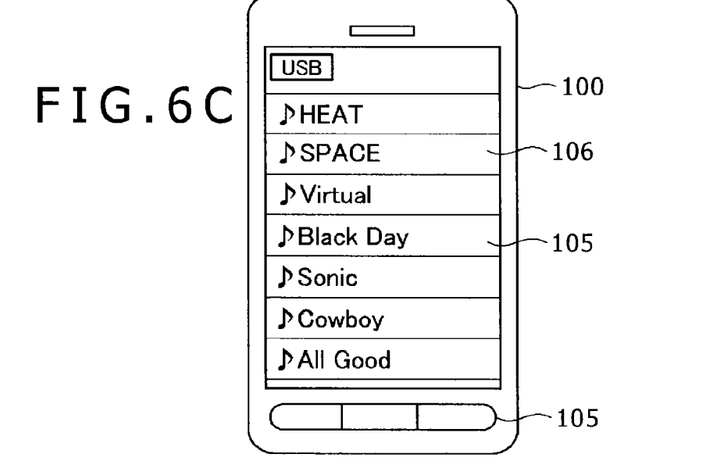

FIGS. 6A, 6B and 6C show typical information display screens that appear on the display block 106 of the terminal apparatus 100. FIG. 6A shows a first mode of the information display screen. What is displayed in the first mode are the title of the content currently reproduced on the content reproduction apparatus 200, the artist's name and album title associated with the content, reproduction status, reproduction time, and an album jacket. Also displayed in the top left corner of the screen is the type of the content source ("USB" in FIG. 6A) with regard to the content reproduction apparatus 200.

The terminal apparatus 100 such as a smartphone tends to have a larger-sized display block 106 than the content reproduction apparatus 200 such as car audio equipment. Thus unlike in the display examples of the content reproduction apparatus 200 shown in FIGS. 4A and 4B, the terminal apparatus 100 such as a smartphone can display a plurality of items of information at the same time. Also, the terminal apparatus 100 such as a smartphone tends to have a higher-resolution display block 106 than the content reproduction apparatus 200 such as car audio equipment. Thus the terminal apparatus 100 can display images such as an album jacket of the content of interest more clearly than the content reproduction apparatus 200.

Furthermore, because the terminal apparatus 100 displays information indicating the type of the content source of the content reproduction apparatus 200, the user can continuously grasp the content source from which the currently reproduced content is derived.

FIG. 6B shows a second mode of the information display screen. What is displayed in the second mode are the artist's name, album title, and song titles of the content in question in a hierarchical manner on the left side of the display part. This allows the user to verify at a glance a plurality of items of information about the content of interest.

If the input block 105 and display block 106 of the terminal apparatus 100 are structured as a touch screen that permits input through contact with fingertips or the like, content can be selected by simply touching with fingertips the position where the desired song title or the like is displayed. This makes it possible to search for and select desired content quickly and intuitively.

If the touch screen supports so-called tap input, double-tap input, drag operation, and flick input, the search for and the selection of content can be made more quickly and intuitively than ever.

Tap input is an input operation involving the user's fingertip or the like touching the screen surface only once for a short period of time. Double-tap input is an input operation involving the user's fingertip or the like touching the screen surface twice consecutively at a short interval. The latter operation is used primarily for inputting determinations.

The drag operation is an input operation involving the user's fingertip or the like moving over the screen surface while touching it. The flick operation is an input operation involving the user's fingertip or the like touching a single point on the screen surface before quickly "flicking" the fingertip contacting the screen surface in the desired direction.

Many types of the terminal apparatus 100 such as smartphones have a large-sized display block 106. That display block 106 can thus display the song title, artist's name, album title, and album jacket associated with the content of interest in addition to the hierarchical display, as shown in FIG. 6B. When content-related information is displayed on the terminal apparatus 100 in this manner, the information may be present to the user in more quantity than ever.

FIG. 6C shows a third mode of the information display screen. What is displayed in the third mode is a list of a plurality of song titles of the content stored in a content source of the content reproduction apparatus 200. This permits searches for desired content intuitively and quickly.

In the above-described step S5, the display control block 123 of the terminal apparatus 100 causes the display on the display block 106 to transition to the information display screen such as one of those shown in FIGS. 6A through 6C. Also displayed is the type of the application for content source reproduction indicated in the application information.

Alternatively, depending on the application type, the information display screen in one of the modes shown in FIGS. 6A through 6C or in some other display mode may be selectively displayed on the display block 106.

The display modes for the terminal apparatus 100 are not limited to those shown in FIGS. 6A, 6B and 6C. Any other display mode may be adopted as long as it permits display of information in more quantity and in further detail than before. For example, an animated display for assisting input operations may be provided.

Returning to the explanation of the sequence diagram, the input block 105 of the terminal apparatus 100 accepts an input operation from the user in step S9. In step S10, the operation information representing the detail of the input operation is transmitted from the information transmission block 122 of the terminal apparatus 100 to the content reproduction apparatus 200.

Then in step S11, the information acquisition block 216 of the content reproduction apparatus 200 acquires via the communication block 210 the operation information transmitted from the terminal apparatus 100. The content reproduction apparatus 200 performs processing corresponding to the acquired operation information.

For example, if an input operation is performed on the terminal apparatus 100 to temporarily stop the ongoing reproduction of content, the content reproduction apparatus 200 temporarily stops the content reproduction based on the operation information. In like manner, given the operation information from the terminal apparatus 100, the content reproduction apparatus 200 may perform skip track forward, skip track back, sound volume control, or content selection.

When the content reproduction apparatus 200 has performed processing corresponding to the operation information, the display on the display block 211 of the content reproduction apparatus 200 is updated accordingly. For example, if content has been selected, the currently displayed content title is replaced with the newly selected content title.

Then in step S12, the information transmission block 217 of the content reproduction apparatus 200 transmits the update information indicative of an update of the display details on the content reproduction apparatus 200 to the terminal apparatus 100.

In step S13, the information acquisition block 121 of the terminal apparatus 100 acquires the update information. Based on the acquired update information, the display control block 123 performs a display update process on the display block 106.

Incidentally, the processing from step S6 to step S8 may not necessarily precede the processing from step S9 to step S13. When an input operation is performed on the content reproduction apparatus 200, steps S6 through S8 are carried out; when an input operation is performed on the terminal apparatus 100, steps S9 through S13 are carried out.

According to the technology of this disclosure discussed above, relatively inexpensive car audio equipment with limited display capabilities can still present the user with a wealth of information when used in conjunction with the display block of the terminal apparatus such as the smartphone offering enhanced display performance.

Because the terminal apparatus such as the smartphone equipped with a touch screen can accept intuitively performed input, it is easy and inexpensive to implement enhanced operability that has not been experienced on the content reproduction apparatus such as car audio equipment in the past.

Also according to the technology of this disclosure, the terminal apparatus located separately from the content reproduction apparatus can display content information and accept operation input with regard to the latter apparatus. Thus if a plurality of users are on board a vehicle, with the content reproduction apparatus mounted facing the front seats, one of the users handling the terminal apparatus in the back seat can readily reference content information and perform input operations with regard to the content reproduction apparatus. That means all users on board the vehicle can share the same information regarding the content reproduction apparatus with ease. In the household, a user away from the content reproduction apparatus such as a dock speaker may reference content information and perform input operations on that apparatus using the terminal apparatus at hand.

2. Variations

Although the description above contains many specificities, these should not be construed as limiting the scope of the disclosure but as merely providing illustrations of some of the presently preferred embodiments of this disclosure. It is evident that many alternatives, modifications and variations will become apparent to those skilled in the art in light of the foregoing description.

Although the content reproduction apparatus 200 has been presented as the first device of the disclosed technology and the terminal apparatus 100 as the second device in the foregoing description, specific apparatuses are not limitative of the present disclosure. The disclosed technology applies to any device or apparatus as long as it is capable of two-way communication. For example, both the first and the second devices may be terminal apparatuses 100 such as mobile phones, smartphones, or tablet terminals. As another example, one device may be a TV set and the other device may be the terminal apparatus 100 used in combination.

The disclosed technology may also be configured as follows:

(1) An information processing apparatus including
a first device; and
a second device connected with the first device,
wherein application information about an application executing on the first device is acquired through a communication block included in the second device, and
display on a display block included in the second device is controlled based on the application information.

(2) The information processing apparatus as described in paragraph (1) above,
wherein content information indicative of information related to content reproduced by the application on the first device is acquired through the communication block, and
based on the content information, information about the content is controlled to be displayed on the display block included in the second device.

(3) The information processing apparatus as described in paragraph (1) or (2) above, wherein the application information indicates that the application is executing on the first device.

(4) The information processing apparatus as described in any one of paragraphs (1) through (3) above, wherein the application information indicates the type of the application reproducing content on the first device.

(5) The information processing apparatus as described in any one of paragraphs (1) through (4) above, wherein operation information indicative of details of an input operation performed on an input block included in the second device is transmitted to the first device through the communication block included in the second device.

(6) The information processing apparatus as described in paragraph (5) above,
wherein update information is acquired through the communication block included in the second device, the update information indicating an update of display details on a display block of said first device performed on said first device on the basis of the operation information, and
the display on the display block of the second device is updated based on the update information.

(7) An information processing method for use with a first device and a second device interconnected with each other, the information processing method including:
acquiring application information about an application executing on the first device through a communication block included in the second device; and
controlling display on a display block included in the second device based on the application information.

(8) An information processing program for executing an information processing method in conjunction with a first device and a second device interconnected with each other, the information processing method including:
acquiring application information about an application executing on the first device through a communication block included in the second device; and
controlling display on a display block included in the second device based on the application information.

(9) A terminal apparatus including:
a display block; and
a communication block,
wherein application information about an application executing on another device connected to the terminal apparatus is acquired through the communication block, and
display on the display block is controlled based on the application information.

The present disclosure contains subject matter related to that disclosed in Japanese Priority Patent Application JP 2012-058228 filed in the Japan Patent Office on Mar. 15, 2012, the entire content of which is hereby incorporated by reference.

What is claimed is:

1. An information processing system comprising:
a first device; and
a second device connected with said first device, wherein the second device includes circuitry configured to:
acquire application information regarding an application executed on said first device through communication circuitry included in said second device;
display information based on the application information on a display included in said second device, the displayed information at least indicating a source of a content reproduced by the application on the first device, the source corresponding to a USB-connected external storage device that holds the content;
transmit operation information indicative of details of an input operation performed on an input interface included in the second device to the first device;
acquire update information through the communication circuitry included in the second device, the update information indicating an update of display details on a display of the first device performed on the first device on a basis of the operation information; and
update the display of the second device based on the update information.

2. The information processing system according to claim 1, wherein the circuitry of the second device is configured to:
acquire, via the communication circuitry, content information indicative of information related to the content reproduced by said application on said first device; and
display information about said content based on said content information.

3. The information processing system according to claim 1, wherein said application information represents that the application has been executed by said first device.

4. The information processing system according to claim 1, wherein said application information includes a type of the application that reproduces content on said first device.

5. The information processing system according to claim 1, wherein the transmitted operation information includes either a start operation, a stop operation, a fast forward operation, or a rewind operation.

6. An information processing method for utilizing a first device and a second device, the first device and the second device being interconnected with each other, said information processing method comprising:
   acquiring application information regarding an application being executed on said first device through communication circuitry included in said second device;
   controlling display of information based on the application information on a display included in said second device, the displayed information at least indicating a source of a content reproduced by the application on the first device, the source corresponding to a USB-connected external storage device that holds the content;
   transmitting operation information indicative of details of an input operation performed on an input interface included in the second device to the first device;
   acquiring update information through the communication circuitry included in the second device, the update information indicating an update of display details on a display of the first device performed on the first device on a basis of the operation information; and
   updating the display of the second device based on the update information.

7. A non-transitory computer readable storage device that includes computer readable instructions that when executed by processing circuitry performs an information processing method for utilizing a first device and a second device, the first device and the second device being interconnected with each other, the method comprising:
   acquiring application information regarding an application being executed on said first device through communication circuitry included in said second device;
   controlling display of information based on the application information on a display included in said second device, the displayed information at least indicating a source of a content reproduced by the application on the first device, the source corresponding to a USB-connected external storage device that holds the content;
   transmitting operation information indicative of details of an input operation performed on an input interface included in the second device to the first device;
   acquiring update information through the communication circuitry included in the second device, the update information indicating an update of display details on a display of the first device performed on the first device on a basis of the operation information; and
   updating the display of the second device based on the update information.

8. A terminal apparatus comprising:
a display; and
circuitry configured to:
   acquire application information regarding an application executed on another device connected to said terminal apparatus;
   display information based on the application information on said display, the displayed information at least indicating of a source of a content reproduced by the application on the another device, the source corresponding to a USB-connected external storage device that holds the content;
   transmit operation information indicative of details of an input operation performed on an input interface included in the terminal apparatus to the other device;
   acquire update information, the update information indicating an update of display details on a display of the other device performed on the other device on a basis of the operation information; and
   update the display of the terminal apparatus based on the update information.

* * * * *